United States Patent
Watanabe et al.

(10) Patent No.: US 6,693,774 B2
(45) Date of Patent: Feb. 17, 2004

(54) MAGNETORESISTIVE SENSOR AND MAGNETIC STORAGE APPARATUS

(75) Inventors: Katsuro Watanabe, Odawara (JP); Hiromasa Takahashi, Hachioji (JP); Nobuo Yoshida, Odawara (JP); Takashi Kawabe, Hitachi (JP); Kazuhiro Nakamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 09/803,032

(22) Filed: Mar. 12, 2001

(65) Prior Publication Data

US 2001/0028538 A1 Oct. 11, 2001

(30) Foreign Application Priority Data

Mar. 13, 2000 (JP) .......................... 2000-073925

(51) Int. Cl.⁷ .............................. G11B 5/127; G11B 5/39
(52) U.S. Cl. ..................................... 360/319
(58) Field of Search ................. 360/319, 320, 360/317, 324, 324.1, 324.2, 323, 313, 110

(56) References Cited

U.S. PATENT DOCUMENTS

| 5,206,590 | A | | 4/1993 | Dieny et al. ............... 324/252 |
| 5,568,335 | A | * | 10/1996 | Fontana et al. ............. 360/320 |
| 5,936,810 | A | | 8/1999 | Nakamoto et al. ........ 360/324.1 |
| 6,292,334 | B1 | * | 9/2001 | Koike et al. ................. 360/319 |
| 6,452,761 | B1 | * | 9/2002 | Carey et al. ................. 360/320 |
| 2002/0015267 | A1 | * | 2/2002 | Sato ........................... 360/320 |
| 2002/0027753 | A1 | * | 3/2002 | Ishiwata et al. ........... 360/324.2 |

FOREIGN PATENT DOCUMENTS

| JP | 4-358310 | 12/1992 |
| JP | 5-266437 | 10/1993 |
| JP | 9-282618 | 10/1997 |

* cited by examiner

*Primary Examiner*—Julie Anne Watko
(74) *Attorney, Agent, or Firm*—Antonelli, Terry, Stout & Kraus, LLP

(57) ABSTRACT

A magnetoresistive sensor which, despite a narrow reproducing shield gap, affords high resolution and high reproducing output because of its structure and is able to minimize the amount of sense current leaking into the shield layer through the gap layer. A magnetic storage apparatus suitable for high-density recording is provided with a magnetic head having said magnetoresistive sensor. The structure is characterized in that at least either of the lower shield layer or upper shield layer is partly or entirely a magnetic layer which is a composite film composed of ferromagnetic metal and oxide, and an insulation protective film is arranged between the electrode film or longitudinal bias film and the magnetic film which is a composite film composed of ferromagnetic metal and oxide.

14 Claims, 12 Drawing Sheets

FIG. 23
(CONVENTIONAL)
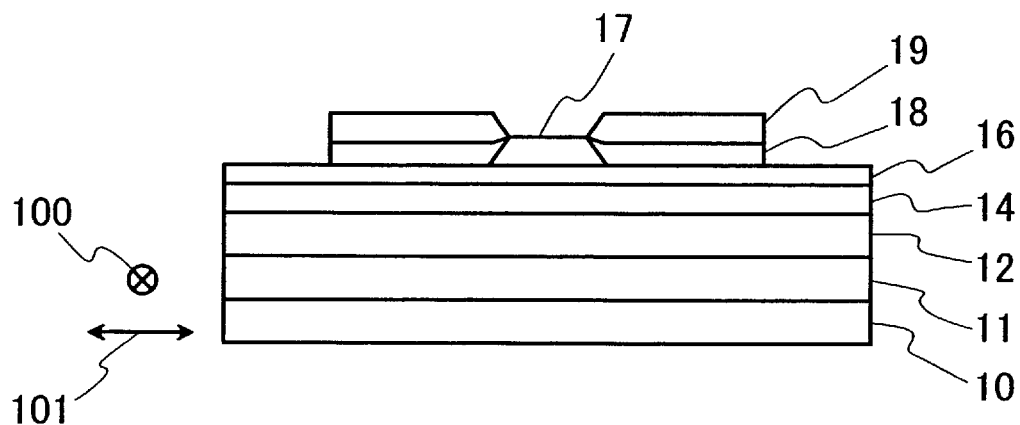
FIG. 24
(CONVENTIONAL)
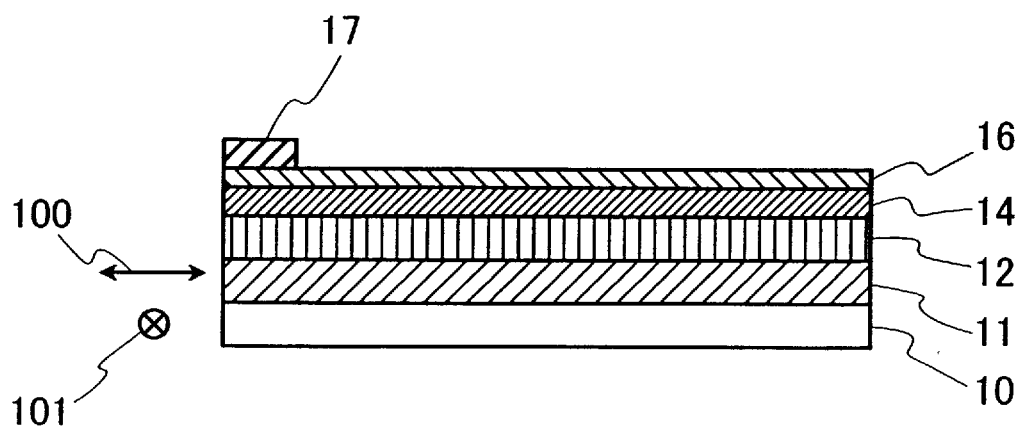

MAGNETORESISTIVE SENSOR AND MAGNETIC STORAGE APPARATUS

BACKGROUND OF THE INVENTION

The present invention relates to a magnetoresistive sensor to reproduce magnetically recorded information and also to a magnetic storage apparatus equipped therewith. More particularly, the present invention relates to a magnetoresistive sensor which has a superior reproducing resolution and to a magnetic storage apparatus using that sensor.

Magnetic storage apparatus, particularly magnetic disk apparatus, have been developed which have a remarkably improved recording density. This requires higher performance than before from the storage head, which is a key device of the magnetic disk apparatus, as well as from recording elements and reproducing elements.

The object of increasing the recording density for reproducing elements can be achieved using the following three technologies.

First, the technology of increasing sensitivity, which recently employs an MR head utilizing the magnetoresistive effect. For recording densities lower than a, few Gb/in$^2$, the conversion of magnetic signals on a magnetic disk into electrical signals has been accomplished by means of an anisotropic magnetoresistive effect (AMR effect). The AMR effect, however, does not provide sufficient sensitivity for higher recording densities. In the case of a magnetic disk apparatus designed for high recording density, this difficulty has been overcome by employing an MR head which makes use of the giant magnetoresistive effect (GMR effect) for higher sensitivity.

One example of heads utilizing the GMR effect is disclosed in Japanese Patent Laid-open No. 3S8310/1992. This head has a so-called spin-valve structure, which is composed of a pinned layer and a free layer, the former being magnetized in a specific fixed direction by exchange coupling between it and an antiferromagnetic layer and the latter being laminated onto the pinned layer with a thin nonmagnetic conductive layer interposed between them. The electric resistance of a GMR film will vary according to the relative angle between the magnetization direction of the free layer and that of the pinned layer.

The second technology aims at reducing the reproducing track width, based on the idea that the reduced track width increases the track density. The width of the reproducing track is basically determined by the distance between the electrodes to supply the magnetoresistive film with the sense current to detect the change in resistance. Incidentally, the reproducing element needs longitudinal bias layers arranged at both sides, of the magnetoresistive film so as to suppress Barkhausen noise. The disadvantage of this provision is that the anisotropy field in portions near the longitudinal bias layer in the magnetoresistive film substantially increases due to the strong magnetic field from the longitudinal bias layer. The result is an extremely deteriorated sensitivity to the external magnetic field. This phenomenon becomes significant as the reproducing track width is reduced. A countermeasure disclosed in Japanese Patent Laid-open No. 282618/1997 consists of making the electrode distance smaller than the distance between the longitudinal bias layers so that the device does not detect signals with low sensitivity to the external magnetic field.

The third technology is concerned with the reduction of the distance between shield layers (shield gap) in the reproducing head. With a narrow shield gap, it is possible to achieve high-resolution reproduction even in the case of high linear recording density, which leads to an increase in the linear recording density. The currently available magnetic head has a shield gap of about 100 nm. Usually, the shield layers are arranged over and under the magnetoresistive film. Between the shield layer and the magnetoresistive film, a gap layer of insulating material is placed so that the sense current does not flow into the shield layer when the sense current is applied to the magnetoresistive film. As the distance between the reproducing shield layers decreases, the thickness of the gap layer also decreases, with the result that the gap layer becomes incapable of effective insulation because of its dependence on the film thickness for its characteristics and because of pinholes present therein. The consequence is that the sense current penetrates through the gap layer and leaks to the shield layer, causing the magnetic head to have a reduced reproducing output.

One way for solution to this problem is by arrangement of an insulating magnetic layer (specifically a NiZn ferrite layer) on the surface of one of the shield layers adjacent to the magnetoresistive film, as disclosed in Japanese Patent Laid-open No. 266437/1993.

An example of the insulating magnetic layer is shown in the synopsis of the lecture at the 18$^{th}$ conference (1994) of the Magnetics Society of Japan (p. 311). It is a thin film of Co—Al—O or Fe—Si—O which possesses higher resistivity ($10^2$–$10^7$ $\mu\Omega$.cm) than ordinary metal thin film (although this resistivity is lower than that of the above-mentioned NiZn ferrite) as well as good soft magnetic properties.

SUMMARY OF THE INVENTION

Three technologies have been introduced which were developed to cope with the need for increasing the recording density of a recording element. Although the first two are feasible with currently available means, the last one to reduce the reproducing shield gap has a problem that remains unsolved.

The idea (proposed in Japanese Patent Laid-open No. 266437/1993 mentioned above) of providing an insulating magnetic layer of NiZn ferrite on the surface of at least one of the shield layers adjacent to the magnetoresistive film poses a problem as follows. NiZn ferrite in its bulk form is of spinel structure and has a high permeability and a high resistivity (about $10^5$–$10^6$ $\mu\Omega$.cm). However, in its thin film form prepared by sputtering at a temperature lower than about 300° C. (which is ordinarily employed for production of thin-film magnetic heads), it is amorphous rather than crystalline (spinel). Therefore, the thin film of NiZn ferrite used as the shield layer for the magnetic head has to be formed by heating the substrate above 500° C. or has to be annealed at 500–800° C. after film forming so that the resulting thin film has a spinel structure.

Unfortunately, the magnetoresistive film to produce the GMR effect is a laminate composed of thin layers (tens of A thick each) and hence it merely withstands heat up to about 300° C. Therefore, it becomes poor in magnetoresistive characteristics when NiZn ferrite requiring a high processing temperature is used as the shield layer, particularly as the upper shield layer.

On the other hand, the metal-oxide composite thin film described in the synopsis of the lecture at the 18$^{th}$ conference (1994) of the Magnetics Society of Japan (p. 311) offers the advantage of being prepared at a temperature lower than that which the magnetoresistive film (for GMR effect) withstands. However, it still has a disadvantage of lacking satisfactory insulation in an instance where the shield film is thin, because, despite its high resistivity, it decreases in resistance as it decreases in thickness and increases in area.

Another disadvantage is that it is difficult to secure sufficient insulation for the gap layer because it is necessary to reduce the thickness of the gap layer as the distance between the reproducing shields is reduced. The result of insufficient insulation is that the sense current leaks to the shield layer, causing the reproducing output of the magnetic head to reduce considerably.

It is an object of the present invention to provide a magnetic head which affords high resolution and high reproducing output, with none or a minimum of sense current leaking to the shield layer, even in the case where the shield gap, is reduced. It is another object of the present invention to provide a magnetic head with a magnetoresistive sensor coping with the higher recording density and also to provide a magnetic storage apparatus equipped with said magnetic head.

BRIEF DESCRIPTION OF THE DRAWINGS

FIG. 23 is a diagram showing the structure of a conventional magnetoresistive sensor lacking an insulation protective film.

FIG. 24 is a diagram showing the sectional structure of the magnetoresistive sensor shown in FIG. 23, as viewed from a cross section cut in the head depth direction such that the cross section includes the magnetoresistive film.

DESCRIPTION OF THE PREFERRED EMBODIMENTS

Figure 1:
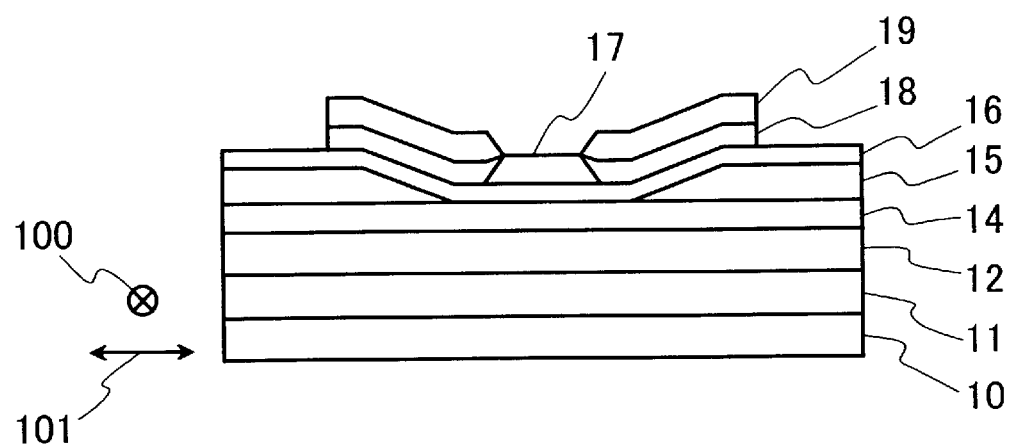
FIG. 1 is a diagram showing the structure of the magnetoresistive sensor in Example 1 of the present invention, as viewed from the side facing the medium.

The above-mentioned object of the present invention is achieved by the magnetic head with a magnetoresistive sensor and the magnetic storage apparatus equipped with said magnetic head, which are explained in the following.

The present invention is directed to a magnetoresistive sensor having a pair of shield layers, a magnetoresistive film interposed between these shield layers, an electrode to apply a signal-detecting current to the magnetoresistive film, and a longitudinal bias layer to suppress the Barkhausen noise of the magnetoresistive film, wherein an insulation protective film is interposed between the shield layer and the electrode. The insulation protective film prevents the sense current from leaking to the shield layer at its position.

Moreover, the insulation protective film reduces the amount of the sense current leaking into the shield layer. Leakage of the sense current into the shield layer takes place in the region where the insulation protective film is not formed. The result of forming the insulation protective film is that the region through which the sense current flows is smaller than in the case where the insulation protective film is not formed. In other words, the insulation protective film reduces the shunting pass for the sense current. The reduced shunting pass has an increased resistance and hence resists the flow of the sense current. The consequence is a decrease in the sense current leaking into the shield layer.

Now, the insulation protective film should preferably be arranged at least outside the active region of the magnetoresistive film (in which resistance changes in response to the external magnetic field) for the following reason. The reproducing resolution of the magnetic head is determined by the shield gap and hence an unnecessarily large shield gap deteriorates the reproducing characteristics. The insulation protective film, which is formed between the shield layer and the electrode, increases the shield gap as much as its thickness at the position where it is formed. Incidentally, "the active region of the magnetoresistive film" corresponds to the region between the electrodes or longitudinal bias layers formed at both ends of the magnetoresistive film.

Moreover, the insulation protective film should preferably extend inward from the region where the shield layer exists (as viewed from above the substrate). In this way it is possible to reduce the shunting pass for the sense current leaking into the shield layer.

The insulation protective film functions satisfactorily so long as it is arranged outside the active region of the magnetoresistive film and inside the region where the shield layer exists. Therefore, it is possible in principle to form the insulation protective film such that the boundary between the regions in which the insulation protective film is and is not arranged coincides with the boundary between the regions in which the magnetoresistive film is and is not arranged. However, it is difficult to form (with the present technology) the insulation protective film such that the boundary of the magnetoresistive film coincides with the boundary of the insulation protective film. A region not containing the insulation protective film is inevitably formed outside the magnetoresistive film. It is through this region that the sense current leaks into the shield layer.

In this case it is possible to reduce the sense current leaking into the shield layer if the electrodes or the longitudinal bias films are patterned as follows when the magnetic head is produced.

The paired electrodes or longitudinal bias films, which are formed at both ends of the magnetoresistive film, should be patterned such that their distance is constant in the vicinity of the magnetoresistive film but increases in going upward in the head depth direction. Thus, the paired electrodes or longitudinal bias films face each other, separated by parallel straight lines (as viewed from above the substrate) in the vicinity of the region in which the magnetoresistive film is arranged. These parallel straight lines terminate at a position high in the head depth direction, because the distance between the electrodes or longitudinal bias films increases at that position.

As mentioned above, outside the magnetoresistive film is a region in which the insulation protective film is not arranged. It is through this region that the sense current leaks into the shield layer. A less amount of sense current leaks through this region in which the distance between the electrodes or the longitudinal bias films is large, because the electric resistance of the current path is high in proportion to the distance. If the electrodes or longitudinal bias films are arranged such that $H_1 \leq W_1$, where $H_1$ denotes the length of that part of the mutually parallel straight lines which is not in contact with the magnetoresistive film and $W_1$ denotes the distance between the mutually parallel straight lines, then the leakage of the sense current decreases because the length through which the sense current leaks is greater than the width through which the sense current leaks and hence the resistance of the shunting pass increases. In this way, it is possible to suppress the leakage of the sense current.

The shield layer should preferably be formed from a high-resistance material, such as a mixture of ferromagnetic metal and oxide, a laminate film of ferromagnetic metal and oxide, and a composite film of ferromagnetic metal (in the form of oxide soft magnetic film) a rod oxide. The shield layer formed from a high-resistance material has a high resistance; this means that the shunting pass has a high resistance when the sense current leaks into the shield layer. This results in the sense current leaking less into the shield layer.

The shield layer does not need to be a single-layer film; it may be formed by lamination from a high-resistance film (mentioned above) and a film of conventional shield material. To be specific, the laminate may be composed of a second magnetic layer (which is a composite film of ferromagnetic metal and oxide) and a first magnetic layer (which may have a low resistance). Alternatively, it may be composed of a second magnetic layer, an insulation layer, and a first magnetic layer. (The second magnetic layer is adjacent to the magnetoresistive film of the shield layer.)

The laminate having the shield layer composed of a first magnetic layer, an insulation layer, and a second magnetic layer may cause a problem of the insulation layer (held between a first and second magnetic layers) becoming charged for breakdown at the time of head production. A solution to this problem is to provide a contact layer within the region which is a part of the above-mentioned insulation layer and is covered by the insulation protective film. This contact layer will electrically connect the first magnetic layer and the second magnetic layer to each other. In this way it impossible to protect the shield layer from breakdown at the time of head production and to realize high yields and high reliability.

In the case where the above-mentioned contact layer is provided, the sense current is likely to leak into the shield layer from the vicinity of the magnetoresistive effect layer through the second magnetic layer, the contact layer, and the first magnetic layer. However, if the distance from the vicinity of the magnetoresistive film to the contact layer is sufficiently large compared with the thickness of the second magnetic layer, then the sense current shunts only a little. This leads to good reproducing characteristics comparable to those obtained by a device without a contact layer.

Incidentally, the magnetoresistive film may include a sensing film utilizing the anisotropic magnetoresistive effect (AMR effect), which is comparatively resistant to high-temperature processing, as well as a GMR effect film (which provides high sensitivity) and a magnetoresistive film with ferromagnetic tunnel junction.

EMBODIMENTS

In the following description, the embodiments of the present invention will be described with reference to the accompanying drawings.

EXAMPLE 1

Figure 2:
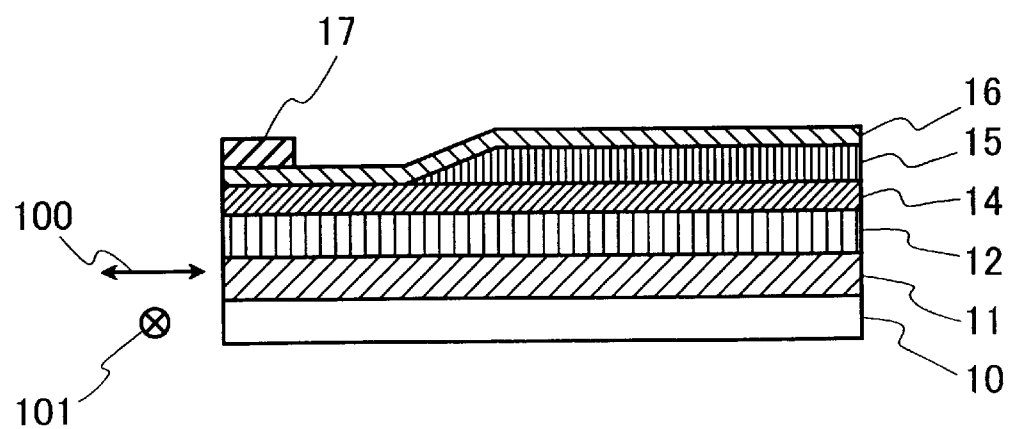
FIG. 2 is a diagram showing the sectional structure of the magnetoresistive sensor shown in FIG. 1, as viewed from a cross section cut in the head depth direction such that the cross section includes the magnetoresistive film.

FIG. 1 is a diagram showing the structure of the magnetoresistive sensor according to one embodiment of the present invention, as viewed from the air bearing surface. FIG. 2 is a diagram showing the sectional structure of the magnetoresistive sensor shown in FIG. 1, as viewed from the cross section cut in the head depth direction. Although FIG. 1 shows only the structure below the magnetoresistive film, there are an upper gap layer and an upper shield layer formed on the longitudinal bias film and the lower gap layer. In FIG. 1, the arrow 100 denotes the head depth direction and the arrow 101 denotes the track direction. In the following description, the composition of the material is expressed in terms of atomic percent.

On a substrate 10 there is formed a base insulation film 11 of alumina or the like, which is subsequently finely polished. A lower shield layer is formed, which is composed of a first magnetic layer 12 and a second magnetic layer 14. The first magnetic layer 12 is a film of $Ni_{81}Fe_{19}$ having a thickness of 2 μm, to be formed by plating or sputtering. It functions not only as a shield layer, but also as a radiator film to dissipate Joule heat generated by the sense current flowing through the magnetoresistive film. The second magnetic layer 14 is a high-resistance composite film composed of ferromagnetic metal and oxide. In this example, it is a multi-layered film (50 nm thick) composed of $Co_{90}Fe_{10}$ layers (1.5 nm thick each) and aluminum oxide film layers (1.0 nm thick each) which are laminated one over the other. A lower insulation protective film 15 (100 nm thick) is formed on the second magnetic layer 14 except for the part to become the reproducing shield gap (or the lower shield layer and upper shield layer, not shown in FIGS. 1 and 2, said part holding the magnetoresistive film 17 between). Then, a lower gap layer 16 (21 nm thick) is formed which is composed of aluminum oxide and silicon oxide. On the lower gap layer 16 there is formed the magnetoresistive film 17, which is a GMR effect film composed of an antiferromagnetic layer of $Pt_{48}Mn_{52}$ (12 nm), a pinned layer composed of Co (1 nm), Ru (0.8 nm), and Co (2 nm), a nonmagnetic conducting layer of Cu (2 nm), a free layer composed of Co (0.5 nm) and $Ni_{81}Fe_{19}$ (2.5 nm), and a protective film of Ta (3 nm), arranged upward. With a lift-off mask formed on a prescribed region (which becomes the active region later), the GMR magnetoresistive film 17 undergoes etching by the ion milling method. After etching, a longitudinal bias film (composed of a Cr underlying film and a CoCrPt film) and an electrode 19 are formed, and the lift-off mask is removed. Finally, a 36-nm thick upper gap layer composed of aluminum oxide and silicon oxide and an upper shield layer are formed (both not shown). In this way the magnetoresistive sensor in this example is completed. It has a reproducing shield gap of 80 nm, which is narrower than that of the existing head.

Incidentally, a GMR magnetoresistive film gives rise to exchange interaction between the pinned layer and the antiferromagnetic layer, causing the direction of magnetization of the pinned layer to orient approximately in one of the head depth directions (indicated by the arrow 100). This is true particularly for a GMR magnetoresistive film formed from an ordered antiferromagnetic material such as Pt-Mn ones. Therefore, it needs annealing after it has been formed. Alternatively, another annealing determining the magnetization direction of the free layer may be carried out after the above annealing, because it is desirable that the free layer should preferably be magnetized in the track direction.

The magnetoresistive sensor is provided thereon with a recording element (not shown) consisting of a pair of magnetic cores formed by lamination, with a recording gap interposed between them. Thus, there is obtained a magnetic head for a magnetic storage apparatus. A detailed description of this is omitted.

The resulting magnetic head was tested for dielectric strength and reproducing characteristics. Samples selected on the wafer were rated as good if they had a breakdown voltage higher than 10 V when a voltage was applied across the upper or lower shield layer and the electrode 19 for application of the sense current to the GMR magnetoresistive film. The ratio of the number of good samples to the number of samples tested was regarded as the yield. Those heads having sufficient dielectric strength do not permit the sense current to leak into the shield layer. The reproducing characteristics were evaluated by reproducing a pattern recorded on a magnetic disk, with the recording density being about 40 $Gb/in^2$ (1 inch=2.54 cm), by using a head having good insulation and resistance as desired. Evaluation is based on resolution at 30 MHz.

Figure 21:
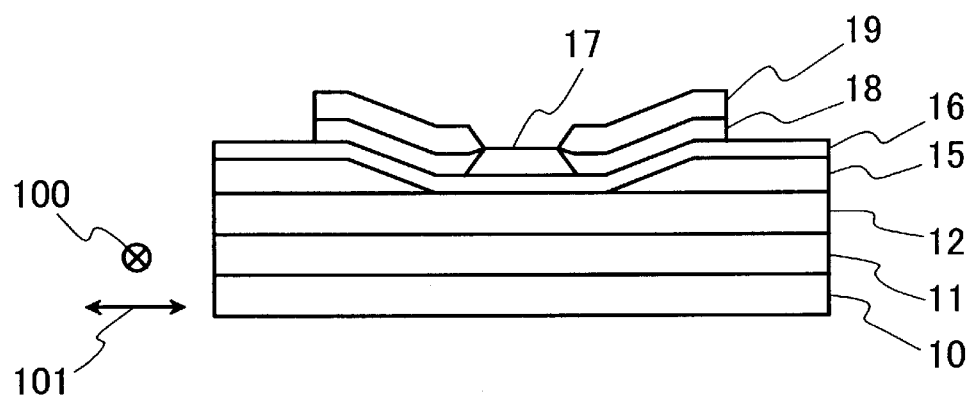
FIG. 21 is a diagram showing the structure of a magnetoresistive sensor having an insulation protective film, but lacking a second magnetic layer, as viewed from the air bearing surface.
Figure 22:
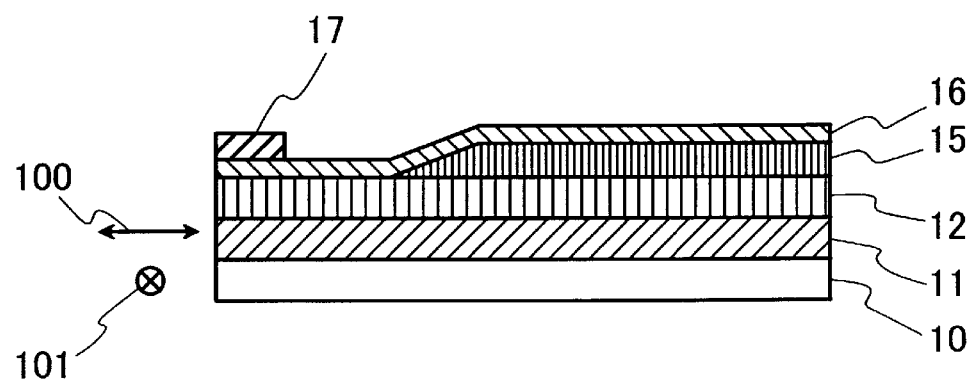
FIG. 22 is a diagram showing the sectional structure of the magnetoresistive sensor shown in FIG. 21, as viewed from a cross section cut in the head depth direction such that the cross section includes the magnetoresistive film.

For comparison, there was produced a magnetic head having the conventional reproducing element (lacking the second magnetic layer 14), as shown in FIGS. 21 and 22. There was also produced a magnetic head which has only the second magnetic layer 14, but lacks the lower protective insulation film 15, as shown in FIGS. 23 and 24. They were evaluated under the same conditions.

The results of evaluation are shown in Table 1.

TABLE 1

| | Insulation breakdown resistance test Yield (%) | Reproducing characteristics Resolution (%), average |
|---|---|---|
| Conventional structure (FIGS. 21 and 22) | 63.7 | 66.6 |
| Structure with the second magnetic layer only (FIGS. 23 and 24) | 74.7 | 66.1 |
| Structure according to the example (FIG. 12) | 98.6 | 66.4 |

It is noted from Table 1 that there is a difference in the yields of the insulation breakdown resistance test between the structure according to the example and the structure with the second magnetic layer only. In the case of the conventional structure, the yield was 63.7%. In the case of the structure with the second magnetic layer only, tile yield was 74.7%. In the case of the structure with both the second magnetic layer 14 and the lower insulation protective film 15 according to the example of the present invention, the yield increases to 98.6%. On the other hand, for the magnetic head with the second magnetic layer 14, the resolution was almost equal to that of the conventional structure, although there is possibility that the resolution decreases if the second magnetic layer 14 has a lower permeability than the first magnetic layer. These results of evaluation indicate that it is possible to produce high-resolution magnetic heads at high yields even though the reproducing shield gap is as narrow as 80 nm if the present invention is employed.

The process mentioned above formed the second magnetic layer 14 in the form of a multi-layer film, 50 nm in total thickness, consisting of 1.5 nm thick $Co_{90}Fe_{10}$ layers and 1.0 nm thick aluminum oxide layers which are laminated alternately. This represents one specific example of a composite film composed of ferromagnetic metal and oxide and does not limit the scope of the invention. In general, the second magnetic layer 14 may be a film of soft magnetic oxide or a film composed of ferromagnetic metal and oxide in the form of mixture or multi-layer film. The soft magnetic oxide has a composition represented approximately by $MFe_2O_4$, where M denotes one or more elements selected from Mn, Fe, Co, Ni, Cu, Zn, and Mg. The ferromagnetic metal is a metal containing at least one ferromagnetic element selected from Fe, Co, and Ni. The oxide is an oxide containing at least one constituent selected from aluminum oxide, silicon oxide, zirconium oxide, hafnium oxide, and tantalum oxide. The composite film of ferromagnetic metal and oxide is usually formed by sputtering which employs one target having a previously established composition or employs two targets of ferromagnetic metal and oxide simultaneously or alternately.

Figure 3:
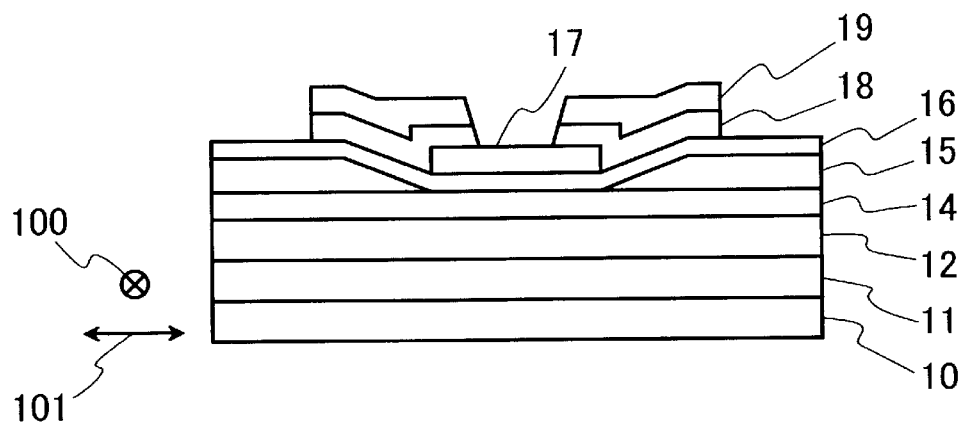
FIG. 3 is a diagram showing the magnetoresistive sensor in Example 1 of the present invention, said sensor differing in the arrangement of the longitudinal bias film and electrode film from that shown in FIG. 1.

Moreover, in the process mentioned above, the magnetoresistive film 17 is a GMR magnetoresistive film which is a laminate composed of an antiferromagnetic layer, a pinned layer, a nonmagnetic conducting layer, and a free layer (arranged upward from the lower gap). This is merely one specific example in the present invention, and it may be replaced by a GMR magnetoresistive film laminated in reverse order, that is, a free layer, a nonmagnetic conducting layer, a pinned layer, and an antiferromagnetic layer, or by an AMR magnetoresistive film composed of a transverse bias film, a nonmagnetic conducting film, and an AMR film. Also, it is not always necessary to arrange the longitudinal bias film 18 and the electrode 19 on both sides of the magnetoresistive film 17, but it is possible to arrange them such that they cover both ends of the magnetoresistive film 17, as shown in FIG. 3.

EXAMPLE 2

Figure 4:
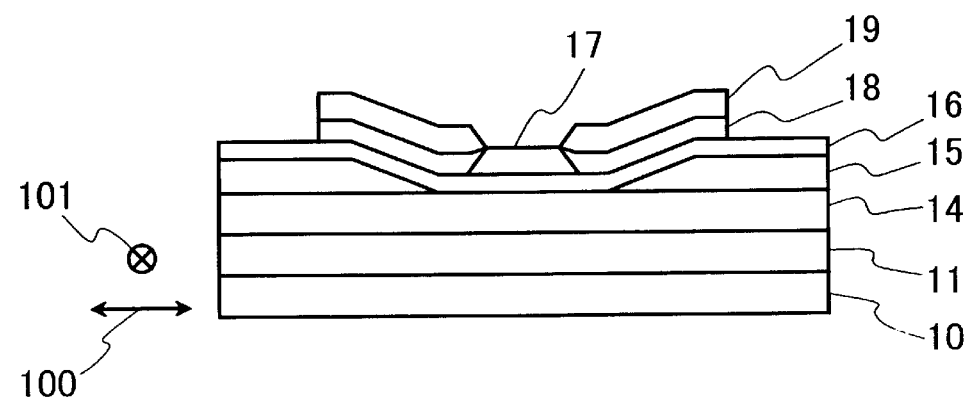
FIG. 4 is a diagram showing the structure of the magnetoresistive sensor in Example 2 of the present invention, as viewed from the air bearing surface.

In Example 1, the lower shield layer consists of two layers (that is, the first magnetic layer 12 and the second magnetic layer 14). However, it may be a single layer of the second magnetic layer 14, as shown in FIG. 4. In this case it is necessary that the second magnetic layer 14 as a whole does not become magnetically saturated by the external magnetic field. The second magnetic layer 14 in Example 2 should have a saturation magnetic flux density and a film thickness such that their product is greater than that of the second magnetic layer 14 in Example 1. This structure provides stable reproducing characteristics. Incidentally, an upper gap layer and an upper shield layer (both not shown) are formed on the lower gap layer 16 and the electrode 19 as in the case of FIG. 1.

EXAMPLE 3

Figure 5:
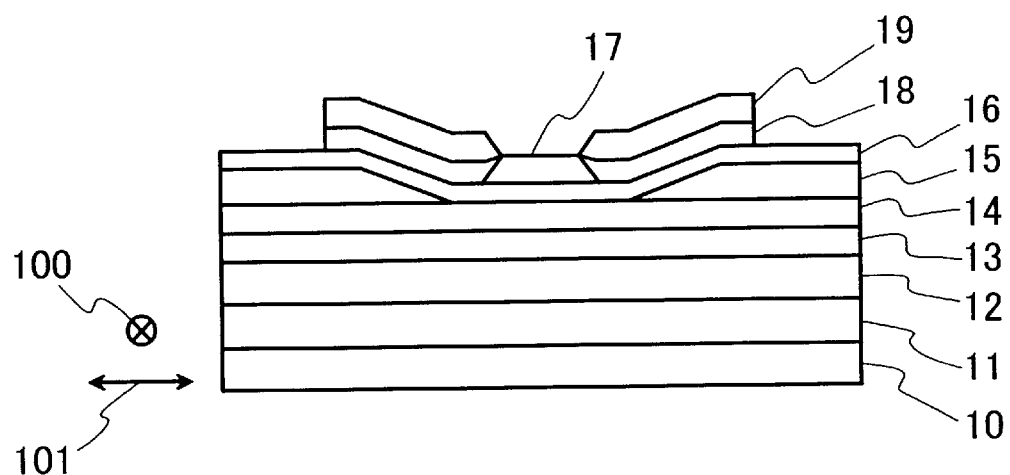
FIG. 5 is a diagram showing the structure of the magnetoresistive sensor in Example 3 of the present invention, as viewed from the air bearing.

This example differs from Example 1 in which the lower shield layer is composed of the first magnetic layer 12 and the second magnetic layer 14 which are laminated one over the other directly. An insulation layer 13 may be interposed between the first magnetic layer 12 and the second magnetic layer 14, as shown in FIG. 5, so as to reduce the leakage of the sense current. The insulation layer 13 may be formed from an oxide, such as aluminum oxide, silicon oxide, zirconium oxide, hafnium oxide, and tantalum oxide, or a mixture thereof. Incidentally, an upper gap layer and an upper shield layer (both not shown) are formed on the lower gap layer 16 and the electrode 19 as in the case of FIG. 1.

EXAMPLE 4

Figure 6:
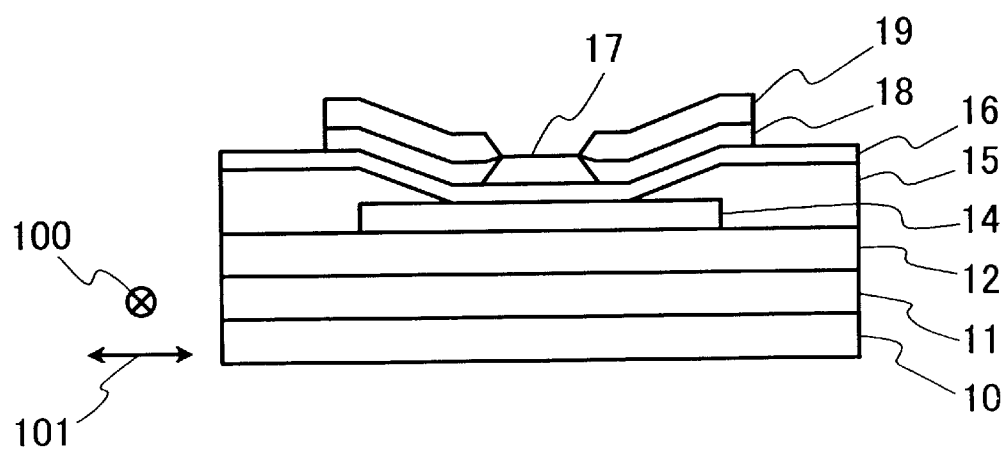
FIG. 6 is a diagram showing the structure of the magnetoresistive sensor in Example 4 of the present invention, as viewed from the air bearing.
Figure 7:
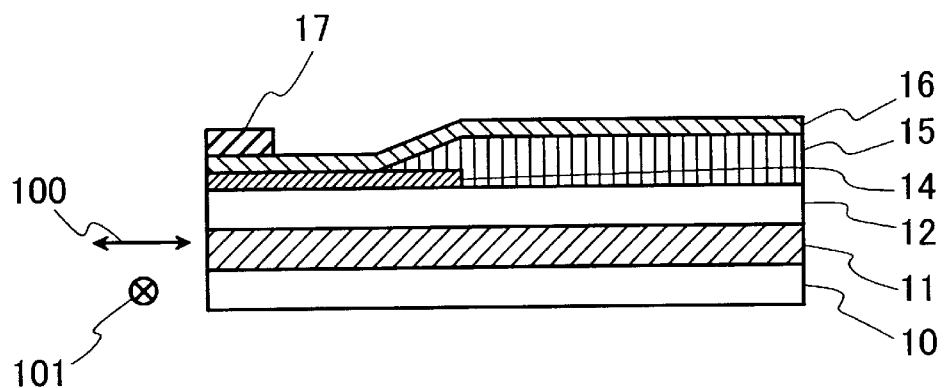
FIG. 7 is a diagram showing the sectional structure of the magnetoresistive sensor in Example 4 of the present invention, as viewed from a cross section cut in the head depth direction such that the cross section includes the magnetoresistive film.

It is not always necessary for the second magnetic layer to be of the same size as the first magnetic layer. FIG. 6 shows the structure of the magnetic head (as viewed from the air bearing surface) in which the second magnetic layer 14 is not of the same size of the first magnetic layer 12, but is arranged only in the vicinity of the magnetoresistive film 17. FIG. 7 is a sectional view taken along the depth direction of the magnetic head at the center of the magnetoresistive film. Incidentally, an upper gap layer and an upper shield layer (both not shown) are formed on the lower gap layer 16 and the electrode 19 as in the case of FIG. 1.

The reproducing resolution is determined by the distance between the lower shield layer and the upper shield layer (this distance is referred to as the reproducing shield gap) at the position where the magnetoresistive film 17 is arranged. Therefore, it is not always necessary that the distance between the upper shield and the lower shield is equal to the reproducing shield gap at a position away from the position where the magnetoresistive film 17 is arranged. The second magnetic layer 14 will suffice if it is arranged only in the vicinity of the magnetoresistive film 17 where the lower insulation protective film 15 cannot be arranged, because it is possible to prevent the sense current from leaking into the shield layer at the part where the lower insulation protective layer 15 is arranged. This structure has no adverse effect on the reproducing characteristics.

Figure 8:
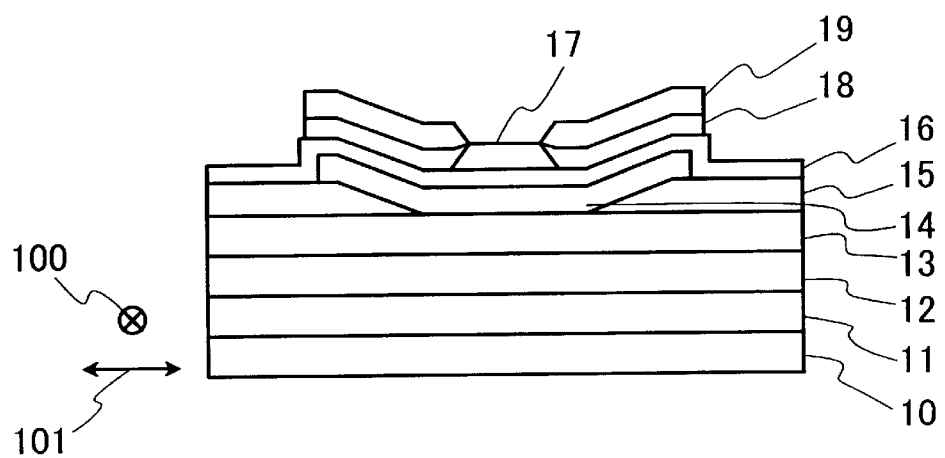
FIG. 8 is a diagram showing the structure of the magnetoresistive sensor similar to that in Example 4 of the present invention, as viewed from the air bearing surface.

A similar structure is shown in FIG. 8, in which the second magnetic layer 14 is arranged after the lower insulation protective film 15 has been formed on the first magnetic layer 12.

EXAMPLE 5

Figure 9:
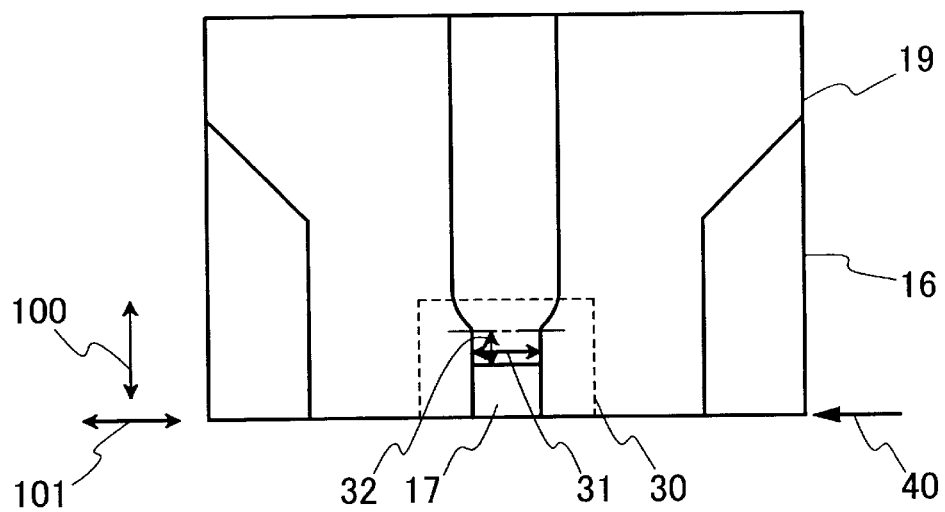
FIG. 9 is a diagram showing the structure of the magnetoresistive sensor in Example 5 of the present invention, as viewed from above the substrate.

FIG. 9 shows the structure (as viewed from above the substrate or FIG. 1 as viewed from the top) after the completion of the step of arranging the longitudinal bias film 18 and the electrode 19 on both sides of the magnetoresistive film 17. In FIG. 9, the lower gap layer 16 looks like the lowermost layer; however, it rests directly on the lower insulation protective layer 15 or the second magnetic layer 14 directly. The dotted line 30 is the boundary between the regions in which the lower insulation protective film is arranged and not arranged. The lower insulation protective film 15 is arranged outside the dotted line 30. The lower insulation protective film 15 prevents the sense current from leaking into the second magnetic layer 14 outside the dotted line 30. However, there is a possibility of the sense current leaking more within the dotted line 30 in which the magnetoresistive film 17 is arranged than in the part where the lower insulation protective film 15 is arranged, because the lower gap layer 16 and the second magnetic layer 15 are laminated on top of the other within the dotted line 30.

In the case where the longitudinal bias film 18 and the electrode film 19 are arranged (the former under the latter on both sides of the magnetoresistive film 17, as shown in FIG. 1, the sense current flows from the longitudinal bias film 18 and the electrode film 19 at one side to those at the other side through the magnetoresistive film 17. The sense current leaking into the second magnetic layer 14 flows from one of the longitudinal bias films 18 to the other of the longitudinal bias films 18 through the lower gap layer 16 and the second magnetic layer 14 in the track direction in the region where the magnetoresistive film 17 does not exist within the dotted line 30.

If the longitudinal bias films 18 hold the magnetoresistive effective film 17 between their edges forming a pair of approximately parallel lines such that $H_1 \leq W_1$, where $H_1$ is the length of those parts of the parallel lines which are not in contact with the magnetoresistive film 17 and $W_1$ is the distance between the parallel lines, then the second magnetic layer 14 increases in resistance in this part. In this way, it is possible to reduce the sense current leaking into the second magnetic layer 14.

In the case where the longitudinal bias film 18 and the electrode film 19 are arranged in reverse order (the former over the latter) on both sides of the magnetoresistive film 17, $W_1$ represents the distance between the electrode films 19.

EXAMPLE 6

Figure 10:
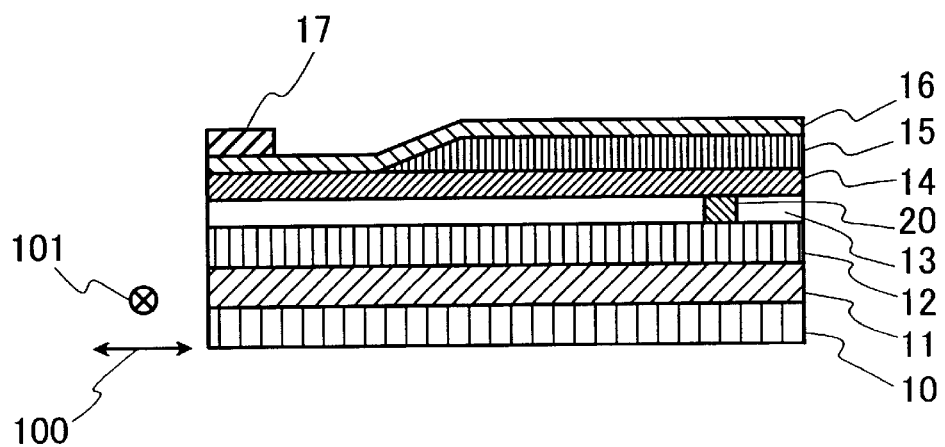
FIG. 10 is a diagram showing the sectional structure of the magnetoresistive sensor in Example 6 of the present invention, as viewed from a cross section cut in the head depth direction such that the cross section includes the magnetoresistive film.

FIG. 10 is a sectional view showing the structure of the magnetoresistive sensor in this example which was cut in the depth direction such that the cut surface contains the magnetoresistive film. Incidentally, an upper gap layer and an upper shield layer (both not shown) are formed on the lower gap layer 16 and the electrode 19 as in the case of FIG. 1.

The disadvantage of the structure in Example 3 (shown in FIG. 5) is that the insulation layer 13 is subject to electrostatic breakdown when charging takes place during wafer processing, assembling, or reproducing. The result of breakdown is the leakage of the sense current into the first magnetic layer 12. This trouble can be avoided if the insulation layer 13 is provided with the contact layer 20 of conductive material (as shown in FIG. 10) such that the first magnetic layer 12 is connected to the second magnetic layer 14 electrically so as to prevent the accumulation of charge in the insulation layer 13. The contact layer 20 should be formed in a part of the region in which the lower insulation protective film 15 is formed later above the insulation layer 13. This structure is possible because the material constituting the second magnetic layer 14 has a high resistivity. With a low resistivity, current would leak into the first magnetic layer 12 through the contact layer 20. This leads to a remarkably deteriorated reproducing output.

The contact layer 20 may be formed from any common metal as a conducting material. The position of the contact layer 20 should be away from the vicinity of the magnetoresistive film 17 where the leakage of sense current is anticipated. The extended path of current flow has a larger resistance and hence prevents the leakage of sense current. In order that the path of current flow has a larger resistance, the area of the contact layer 20 should preferably be as small as possible so long as it provides electrical contact between the first and second magnetic layers 12 and 14.

Incidentally, the contact layer 20 shown in FIG. 10 is formed on the extension of the magnetoresistive film 17 in the head depth direction 100. However, this is not necessarily essential; it may be formed anywhere under the lower insulation protective film 15.

EXAMPLE 7

The above-mentioned examples (1 to 6) are concerned with the structure of the lower shield layer. This example is concerned with the upper shield layer.

Figure 11:
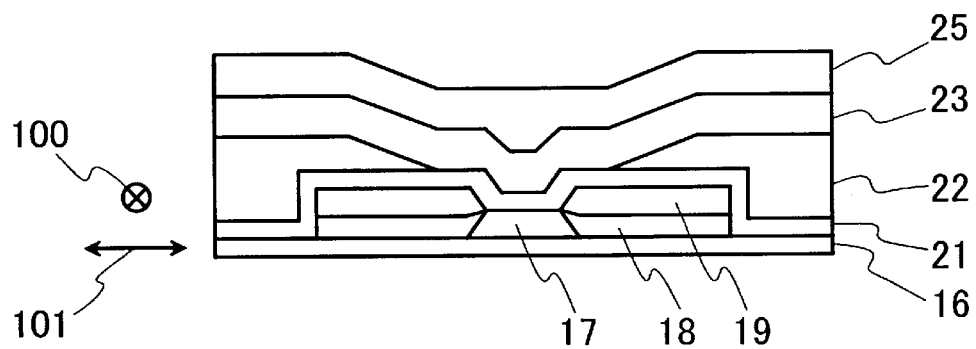
FIG. 11 is a diagram showing the structure of the magnetoresistive sensor in Example 7 of the present invention, as viewed from the air bearing surface.
Figure 12:
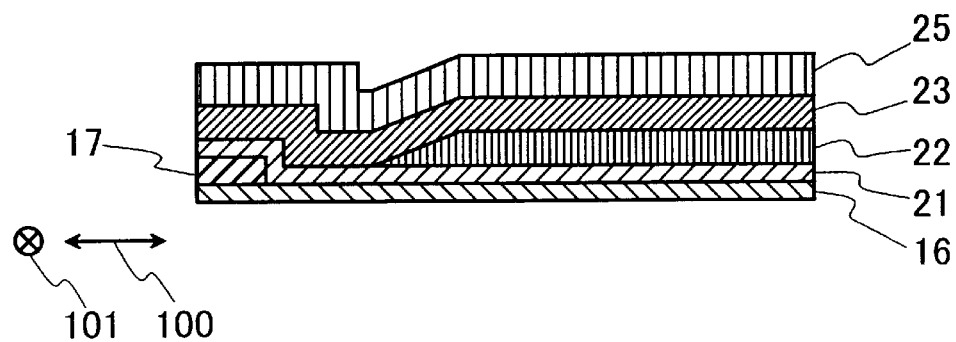
FIG. 12 is a diagram showing the sectional structure of the magnetoresistive sensor in Example 7 of the present invention (shown in FIG. 11), as viewed from the cross section cut in the head depth direction such that the cross section includes the magnetoresistive film.
Figure 13:
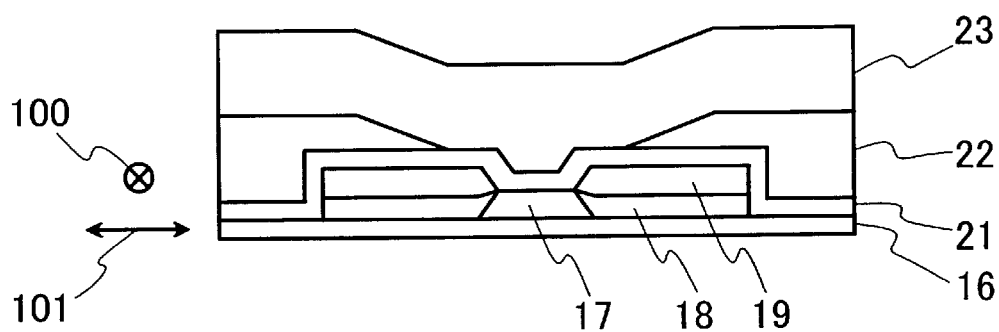
FIG. 13 is a diagram showing the structure of the magnetoresistive sensor in Example 8 of the present invention, as viewed from the air bearing surface.

FIG. 11 is a diagram showing the structure of the magnetoresistive sensor in this example, as viewed from the air bearing surface. FIG. 12 is a diagram showing the sectional structure of the sensor in this example, as viewed from a cross section cut in the head depth direction such that the cross section includes the magnetoresistive film. Incidentally, FIGS. 11 and 12 show only the structure above the lower gap layer 16; in fact, however, a lower shield layer is formed under the lower gap layer 16.

The steps up to the lower gap layer 16 are the same as usual. That is, a finely polished insulation layer and a lower shield layer are formed on the substrate as specified. On the lower gap layer 16, the magnetoresistive film 17, the longitudinal bias layer 18, and the electrode film 19 in the same way as in Example 1. After the upper gap layer 21 has been formed, the upper insulation protective film 22 is formed by the lift-off method, for example, excluding the part which becomes the reproducing shield gap (or that part of the magnetoresistive film 17 which is held between the lower shield layer (not shown in FIGS. 11 and 12) and the upper shield layer). On that are laminated the second magnetic layer 23 serving as the upper shield layer (which is a high-resistance composite film of ferromagnetic metal and oxide) and the first magnetic layer 25 which functions as the magnetic shield and radiator.

As in Example 1, the second magnetic layer 23 may be a multi-layered film with a total thickness of 50 nm which is composed of $Co_{90}Fe_{10}$ films (1.5 nm thick) and aluminum oxide films (1.0 nm) laminated alternately. It may also be an oxide soft magnetic film having a composition close to $MFe_2O_4$ (where M stands for more than one element selected from Mn, Fe, Co, Ni, Cu, Zn, and Mg) or a film of ferromagnetic metal and oxide in-the form of mixture or multiple layers.

A recording element (not shown) is formed which is composed of a pair of magnetic cores laminated with a recording gap interposed between them. In this way, the magnetic head is completed, which is used for the magnetic storage apparatus.

If the structure of the magnetoresistive sensor in this example is combined with the structure of the magnetoresistive sensor mentioned in Examples 1 to 6, it is possible to produce a magnetoresistive sensor in which the reproducing shield gap is smaller than that of the magnetoresistive sensor mentioned in Example 1.

EXAMPLE 8

In Example 7, the upper shield layer is composed of the second magnetic layer 23 and the first magnetic layer 25. However, it may be composed only of the second magnetic layer 23. In this case, the second magnetic layer 23 should be such that the product of saturation magnetic flux density and film thickness is larger than that in Example 7. Incidentally, in actual practice, a lower shield layer (not shown) is formed under the lower gap layer 16.

EXAMPLE 9

Figure 14:
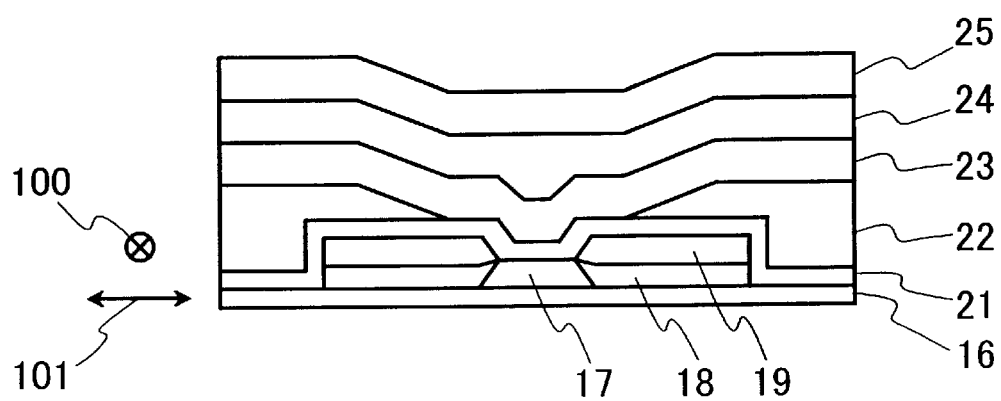
FIG. 14 is a diagram showing the structure of the magnetoresistive sensor in Example 9 of the present invention, as viewed from the air bearing surface.

The structure in Example 7 is such that the upper shield layer is composed of the second magnetic layer 23 and the first magnetic layer 25 which are laminated directly one over the other. This structure may be modified by interposing the insulation layer 24 between the second magnetic layer 23 and the first magnetic layer 25, as shown in FIG. 14, so as to reduce the leakage of sense current. The insulation layer 24 should preferably be 10 to 500 nm in thickness. Incidentally, a lower shield layer (not shown) is formed under the lower gap layer 16, as in FIGS. 11 and 12.

If the upper shield layer is constructed as explained in this example and the lower shield layer (in FIG. 5) is constructed as explained in Example 3, the breakdown voltage remarkably increases because the insulation layers 24 and 13 are interposed respectively between the second magnetic layer 23 and the first magnetic layer 25 and between the first magnetic layer 12 and the second magnetic layer 14. In a structure which lacks the second magnetic layers 14 and 23 and the first insulation layers 13 and 24, very few heads have a breakdown voltage higher than 10 V (measured by the breakdown voltage test) if the reproducing shield gap is 50 nm. However, yields in the breakdown voltage test increased to 92.2% in the case where both the lower shield layer and the upper shield layer were constructed, as mentioned above. Since it is not necessary to provide the lower gap layer 16 and the upper gap layer 21 in principle, the reproducing shield gap may be reduced to the thickness of the magnetoresistive film 17.

EXAMPLE 10

Figure 15:
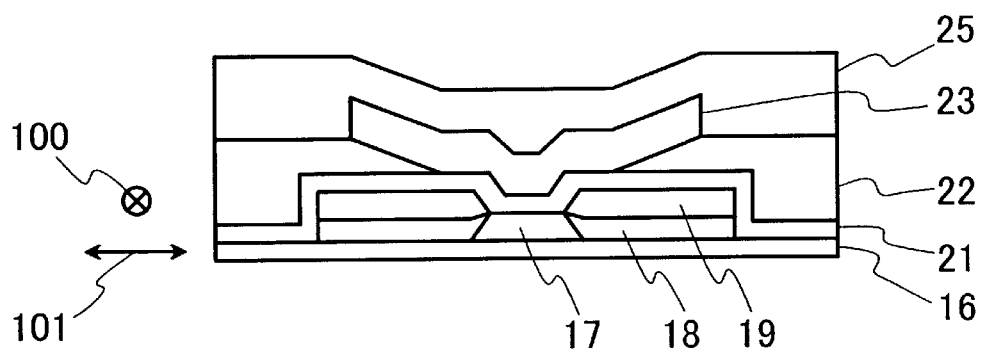
FIG. 15 is a diagram showing the structure of the magnetoresistive sensor in Example 10 of the present invention, as viewed from the air bearing surface.
Figure 16:
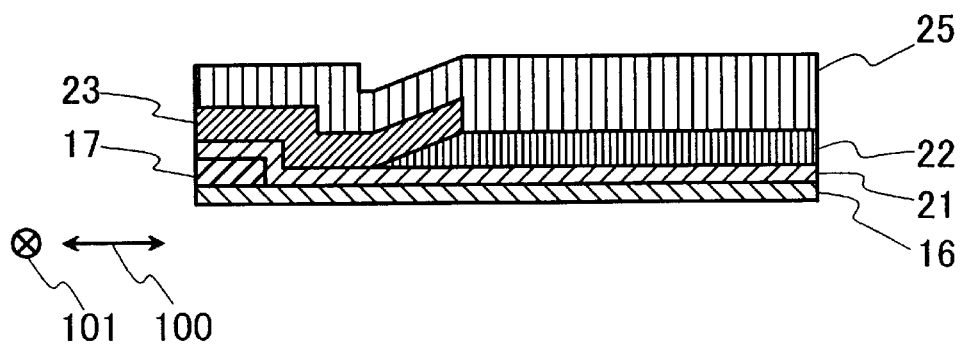
FIG. 16 is a diagram snowing the sectional structure of the magnetoresistive sensor in Example 10 of the present invention, as viewed from a cross section cut in the head depth direction such that the cross section includes the magnetoresistive film.

FIG. 15 is a diagram showing the structure of the magnetoresistive sensor, as viewed from the air bearing surface. This structure is characterized in that the second magnetic layer 23 is not of the same size as the first magnetic layer 25, but is arranged only in the vicinity of the magnetoresistive film 17. FIG. 16 is a diagram showing the sectional structure, as viewed from a cross section cut in the head depth direction such that the cross section includes the magnetoresistive film.

An embodiment in which this structure is applied to the lower shield layer was explained in Example 4. For the same reason, this structure also affords good reproducing characteristics. Incidentally, in actual practice, a lower shield layer (not shown in FIGS. 15 and 16) is formed under the lower gap layer 16.

EXAMPLE 11

Figure 17:
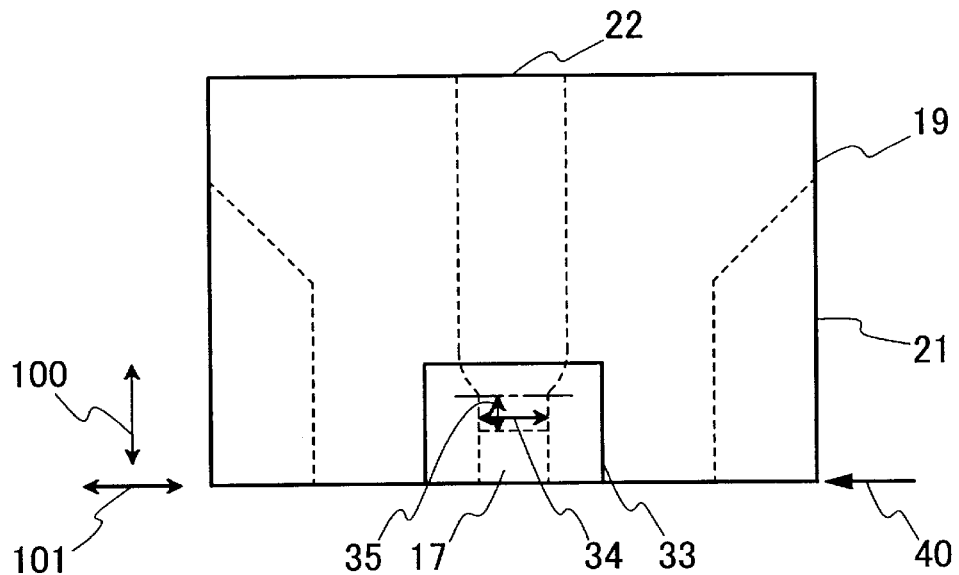
FIG. 17 is a diagram showing the structure of the magnetoresistive sensor in Example 11 of the present invention, as viewed from above the substrate, after the step of arranging the upper insulation protective film 22.

FIG. 17 is a diagram showing the structure, as viewed from above the substrate, with the magnetoresistive film 17, the longitudinal bias film 18, and in which the electrode film 19 formed on the lower gap layer, and the upper gap layer 21 and the upper insulation protective film 22 arranged. (It is the same diagram as that in FIGS. 11 and 12, as viewed from above.)

In FIG. 17, the upper insulation protective film 22 is arranged in a region which is outside the solid line 33. Inside the solid line 33, there are arranged the upper gap layer 21, the magnetoresistive film 17 thereunder (indicated by the broken line), the longitudinal bias film 18, and the electrode film 19 (indicated by the broken line). The longitudinal bias film 18 and the electrode film 19 are close to the magnetoresistive film 17 in the vicinity of the air bearing surface 40, and they extend widely in the head depth direction 100. (In FIG. 17, this is indicated by the reference numeral 19, assuming that the end of the electrode film 19 is in contact with the magnetoresistive film 17.) The longitudinal bias film 18 is not shown in FIG. 17, because the longitudinal bias film 18 is located under the electrode film 19.

In the subsequent steps, the second magnetic layer 23 and the first magnetic layer 25 are formed. It is in the region inside the solid line 33 (in which the upper insulation protective film 22 is not formed) where there is a possibility that the sense current leaks into other than the magnetoresistive film 17, the longitudinal bias film 18, and the electrode film 19. In this region, the sense current leaks from one electrode film 19 to another electrode film 19 in the track direction 101 through the upper gap layer 21 and the second magnetic layer 23.

If the edge of the electrode film 19 comes into contact with the upper surface of the magnetoresistive film 17 within the solid line 33 forming a pair of approximately parallel lines longer along the head depth direction than the depth of the magnetoresistive film 17 such that $H_2 \leq W_2$, where $H_2$ is the length of those parts of the parallel lines which are not in contact with the magnetoresistive film and $W_2$ is the distance between the parallel lines, then the resistance of the second magnetic layer 23 begins to increase, and hence, it is possible to reduce the sense current leaking into the second magnetic layer 23.

In the case where the edge of the longitudinal bias film 18 is in contact with the upper surface of the magnetoresistive film 17 (by contrast to the above-foregoing), then $W_2$ represents the distance of the longitudinal bias films 18.

EXAMPLE 12

Figure 18:
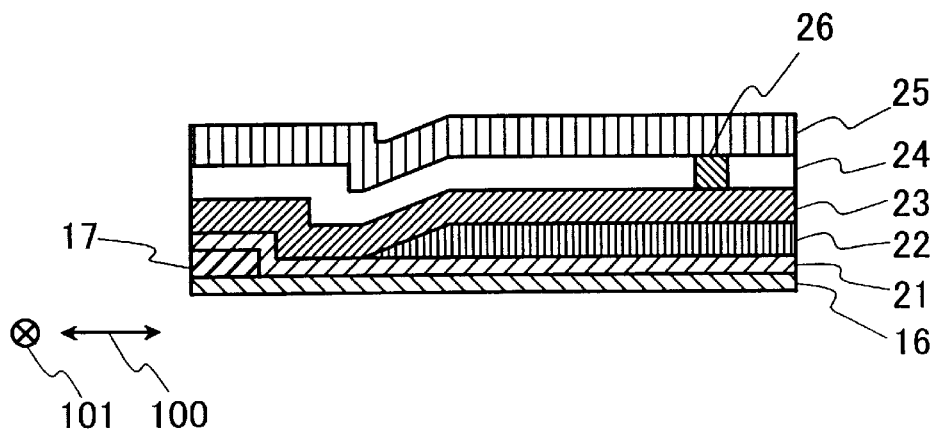
FIG. 18 is a diagram showing the sectional structure of the magnetoresistive sensor in Example 12 of the present invention, as viewed from a cross section cut in the head depth direction such that the cross section includes the magnetoresistive film.

FIG. 18 is a diagram showing the sectional structure of the magnetoresistive sensor in this example, as viewed from cross section cut in the head depth direction such that the cross section includes the magnetoresistive film.

It has been mentioned in Example 6 that it is possible to increase the resistance to electrostatic breakdown by forming a contact layer 20 in part of the insulation layer 13 of the lower shield layer composed of the first magnetic layer 12, the insulation layer 13, and the second magnetic layer 14. This structure may also be applied to the upper shield layer. Incidentally, a lower shield layer (not shown in FIG. 18) is formed under the lower gap layer.

That is, the upper shield layer is constructed from the second magnetic layer 23, the insulation layer 24, and the first magnetic layer 25, and the contact layer 26 of conducting material is formed in part of the region in the insulation layer 24 under which the upper insulation protective film 22 is arranged. The material and position of the contact layer 26 are the same as those in Example 6. In the case where the contact layer is attached to both the lower shield layer and the upper shield layer, it is not always necessary for the position of the contact layer 20 to coincide with the position of the contact layer 26 (as viewed from above).

EXAMPLE 13

Figure 19:
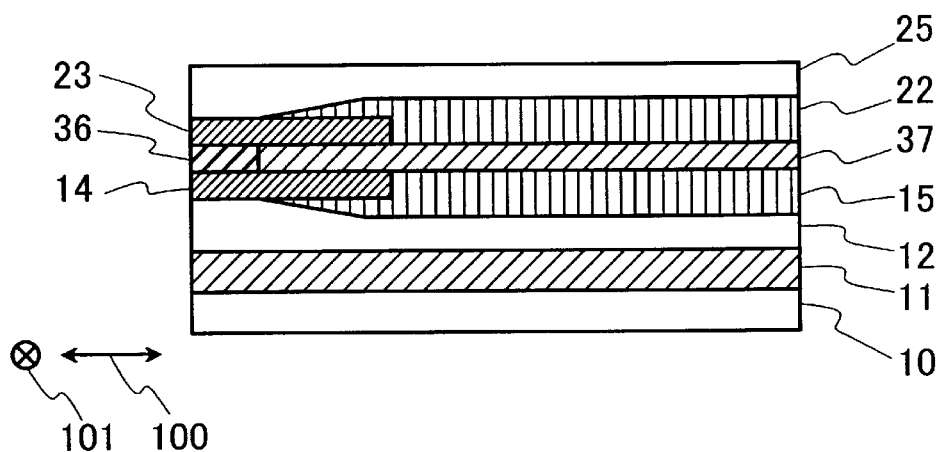
FIG. 19 is a diagram showing the sectional structure of the magnetoresistive sensor in Example 13 of the present invention, as viewed from a cross section cut in the head depth direction such that the cross section includes the magnetoresistive film.

FIG. 19 is a diagram showing the sectional structure of the magnetoresistive sensor in this example, as viewed from a cross section cut in the head depth direction such that the cross section includes the magnetoresistive film. In this example, the magnetoresistive film is replaced by a ferromagnetic tunneling magnetoresistive film, which is defined as a magnetoresistive film that utilizes the tunneling effect taking place between two ferromagnetic layers holding the insulation layer. It is a magnetoresistive film that makes use of the fact that the amount of the current flowing through the insulation layer differs depending on whether the directions of magnetization of two ferromagnetic layers are parallel or antiparallel.

On the substrate 10 having the finely polished base insulation film 11, there is formed the first magnetic layer 12 which functions as the shield layer and the lower electrode. The lower insulation protective film 15 is formed from alumina, and it is subsequently made flat using the CMP (chemical-mechanical polishing) method. The second magnetic layer 14, which is a composite film of ferromagnetic metal and oxide, is arranged at the end of the magnetic layer 14 (the left side in FIG. 19). The lower insulation protective film 15 is formed again from alumina such that its height is about equal to the height of the second magnetic layer 14. At the end of the magnetoresistive sensor, there is formed the ferromagnetic tunneling magnetoresistive film 36, which is composed of the lower magnetic layer, the tunneling barrier layer, and the upper magnetic layer. In its vicinity, the is formed the insulation film 37, for protection of its side. The second magnetic layer 23, which is a composite film of ferromagnetic metal and oxide, is arranged at the end of the magnetoresistive sensor in the same manner as for the second magnetic layer 14. Then, the upper insulation protective film 22 is formed in such a way that it does not cover at least the area above the ferromagnetic tunneling magnetoresistive film 36. The resulting structure produces the following effect. After the first magnetic layer 25, which functions as the shield lager and the upper electrode, has been formed, its electrical contact with the second magnetic layer 23 is secured, so that the sense current flows from the first magnetic layer 25 and the second magnetic layer 23, which functions as both the upper electrode and shield, to the second magnetic layer 14 and the first magnetic layer 12, which functions as both the lower electrode and shield, through the ferromagnetic tunneling magnetoresistive film 36 in its thickness direction.

It is generally considered that any element designed such that the sense current flows across the thickness of the magnetoresistive film could have a narrower reproducing shield gap than that designed such that the sense current flows along the film surface. However, the ferromagnetic tunneling magnetoresistive film 36 increases in element resistance in inverse proportion to the area of the sensor film. For example, the resistance increases to hundreds to thousands of ohms if the area is 0.25 $\mu$m×0.25 $\mu$m. On the other hand, the electrode to apply sense current to the ferromagnetic tunneling magnetoresistive film 36 has an area which is larger than the area of the sensor film. In addition, as the reproducing shield gap decreases, so does the thickness of the barrier layer protective insulation film 37. Consequently, there is a strong possibility that the sense current leaks between electrodes other than those for the ferromagnetic tunneling magnetoresistive film 36. This problem can be solved by providing the second magnetic layers 14 and 23 (which are composite films of ferromagnetic metal and oxide) and the insulation protective films 15 and 22. In this way, it is possible to prevent the sense current from expanding in the direction of the film surface (perpendicular to the paper in FIG. 19), thereby to reduce the effective area of the electrode and to prevent leakage across the electrodes.

Now, the second magnetic layers 14 and 23 (which are composite films of ferromagnetic metal and oxide) are formed from a material having a comparatively high resistivity. The composite film may be used as a part of the electrode if it is not so thick, because it has resistance smaller than that of the ferromagnetic tunneling magnetoresistive film 36.

The structure shown in FIG. 19 is such that the ferromagnetic tunnel junction magnetoresistive film 36 is arranged at the end of the magnetoresistive sensor and exposes itself to the air bearing surface. The fundamental structure in this example may be modified by adding a yoke to introduce a magnetic flux so that the ferromagnetic tunneling magnetoresistive film 36 does not expose itself to the air bearing surface.

EXAMPLE 14

Figure 20:
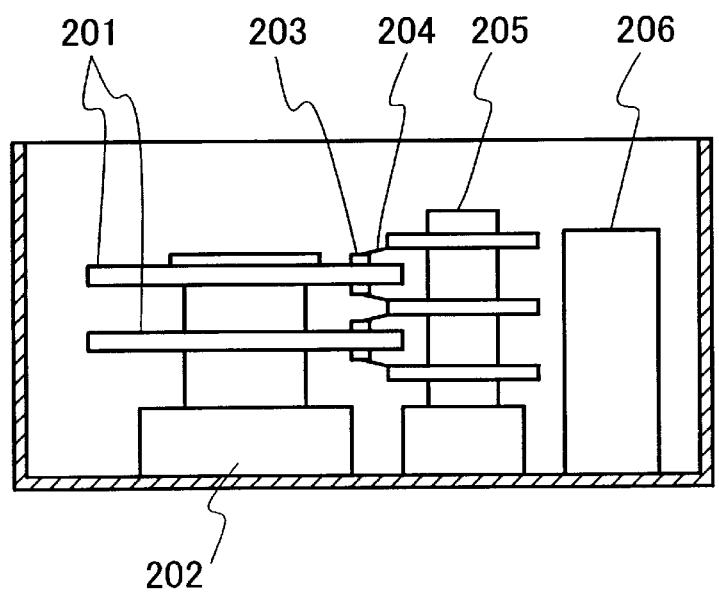
FIG. 20 is a schematic diagram of the magnetic storage apparatus in Example 14 of the present invention.

The magnetic head demonstrated in any of Examples 1 to 13 above is combined with a recording element so as to construct a storage magnetic head which operates in a magnetic storage apparatus capable of recording with a higher density than before. An example of it is schematically shown in FIG. 20. This magnetic storage apparatus consists of a magnetic recording medium 201 on which information is magnetically recorded, a motor 202 to turn the magnetic recording medium 201, a magnetic head slider 203 on which the magnetic head of this example is mounted, a suspension 204 to support the magnetic head slider 203, an actuator 205 to position the magnetic head, and a read-write circuit 206 to process information (recorded and reproduced signals). The magnetic head 203 has a lower shield layer or upper shield layer, to at least either of which is applied the structure with the second magnetic layer 14 or 23 mentioned in the above-foregoing examples. And, the magnetoresistive film 17 is a GMR effect magnetoresistive film or ferromagnetic tunneling magnetoresistive film. In this way, it is possible to provide a magnetic head which has a narrow reproducing shield gap and produces a high output, and thus, it is possible to realize a magnetic storage apparatus capable of high-density recording.

A disk array apparatus can be constructed from several units of the above-mentioned magnetic storage apparatus combined with one another. It will be capable of faster information processing and contribute to higher reliability.

According to the present invention, a magnetic layer in the form of a composite film composed of ferromagnetic metal and oxide is used partly or entirely for at least either of the upper and lower shield layers, and an insulation protective film is arranged between said magnetic layer and the electrode film or longitudinal bias film. This arrangement minimizes the amount of the sense current leaking into the shield layer even though the space of the reproducing shield gap is reduced. The thus produced effect leads to a high-resolution high-output magnetic head suitable for high-density recording. This magnetic head helps realize a magnetic storage apparatus which is capable of high-density recording.

What is claimed is:

1. A magnetic head having a substrate, a pair of shield layers, a magnetoresistive film arranged between said pair of shield layers, a pair of electrodes to apply current to said magnetoresistive film, and a pair of longitudinal bias films, characterized in that an insulation protective film is interposed between either of said pair of electrodes and either of said pair of shield layers, and said either of said pair of shield layers contains at least one magnetic layer having a resistivity which is higher than a resistivity of metal.

2. A magnetic head according to claim 1; wherein either of said pair of shield layers is composed of a second magnetic layer and a first magnetic layer laminated on top of the other (the former being adjacent to the magnetoresistive film) and said second magnetic layer is a mixture of ferromagnetic metal and oxide, a laminate film of ferromagnetic metal and oxide, or an oxide soft magnetic film.

3. A magnetic head according to claim 2; wherein a gap layer is interposed between said magnetoresistive film and either of said pair of shield layers.

4. A magnetic head according to claim 1; wherein either of said pair of shield layers is composed of a second magnetic layer, an insulation layer, and a first magnetic layer laminated one over another (the first being adjacent to the magnetoresistive film) and said second magnetic layer is a mixture of ferromagnetic metal and oxide, a laminate film of ferromagnetic metal and oxide, or an oxide soft magnetic film.

5. A magnetic head according to claim 4; wherein a gap layer is interposed between said magnetoresistive film and either of said pair of shield layers.

6. A magnetic head according to claim 5; wherein said insulation protective film is above or under said magnetoresistive film (as viewed from above the substrate) and is arranged in the region excluding said magnetoresistive film, and the boundary between the region in which said insulation protective film is arranged and the region in which said insulation protective film is not arranged is contained in the region in which said pair of shield layers exist.

7. A magnetic head according to claim 4, wherein part of the insulation layer contained in said lower shield layer or upper shield layer is provided with a contact layer to connect said first magnetic layer with said second magnetic layer.

8. A magnetic head according to claim 1; wherein a gap layer is interposed between said magnetoresistive film and either of said pair of shield layers.

9. A magnetic head according to claim 1; wherein said insulation protective film is above or under said magnetoresistive film (as viewed from above the substrate) and is arranged in the region excluding said magnetoresistive film, and the boundary between the region in which said insulation protective film is arranged and the region in which said insulation protective film is not arranged is contained in the region in which said pair of shield layers exist.

10. A magnetic head according to claim 1; wherein electrodes of said pair of electrodes or films of said pair of longitudinal bias films are formed such that a distance therebetween is constant in the vicinity of the magnetoresistive film and expands at a position raised to a prescribed height in the head depth direction, and said electrodes of said pair of electrodes or said films of said pair of longitudinal bias films have straight lines parallel to each other in the vicinity of the magnetoresistive film such that $H_1 \leq N_1$, where $H_1$ denotes the length of that part of said parallel straight lines which is not in contact with the magnetoresistive film and $N_1$ denotes the space between said parallel straight lines.

11. A magnetic head having a pair of shield layers, a magnetoresistive film arranged in said pair of shield layers, said pair of shield layer functioning as electrodes to apply current to said magnetoresistive film, and insulation films formed at both ends of said magnetoresistive film, characterized in that an additional insulation protective film is interposed between said pair of shield layers and arranged outside the active region of said magnetoresistive film, and either of said pair of shield layers contains at least one magnetic layer having a resistivity which is higher than a resistivity of metal.

12. A magnetic head according claim 11, wherein either of said pair of shield layers is composed of a second magnetic layer and a first magnetic layer laminated on top of the other (the former being adjacent to said magnetoresistive film) and said second magnetic layer is a mixture of ferromagnetic metal and oxide, a laminate film of ferromagnetic metal and oxide, 6 or an oxide soft magnetic film.

13. A magnetic head according to claim 11, wherein said magnetoresistive film is a ferromagnetic tunneling magnetoresistive film.

14. A magnetic storage apparatus having a magnetic recording medium for information recording, a recording-reproducing head with a recording element to record information in said magnetic recording medium and a reproducing element to detect information recorded in said magnetic recording medium, a read-write circuit to send and receive recording and reproducing signals to and from said storage head, an actuator to move said storage head to a prescribed position on said magnetic recording medium, and a means to control said read-write circuit and actuator for storage operation, wherein said reproducing element is a magnetic head having a substrate, a pair of shield layers, a magnetoresistive film arranged between said pair of shield layers, a pair of electrodes to apply current to said magnetoresistive film, and a pair of longitudinal bias films, with an insulation protective film being interposed between either of said pair of electrodes and either of said pair of shield layers, and said either of said pair of shield layers contains at least one magnetic layer having a resistivity which is higher than a resistivity of metal.

* * * * *